Oct. 2, 1928.
W. S. SEWELL
1,686,107
AIR-CONTROLLED PURIFIER
Filed Sept. 8, 1925
2 Sheets-Sheet 2
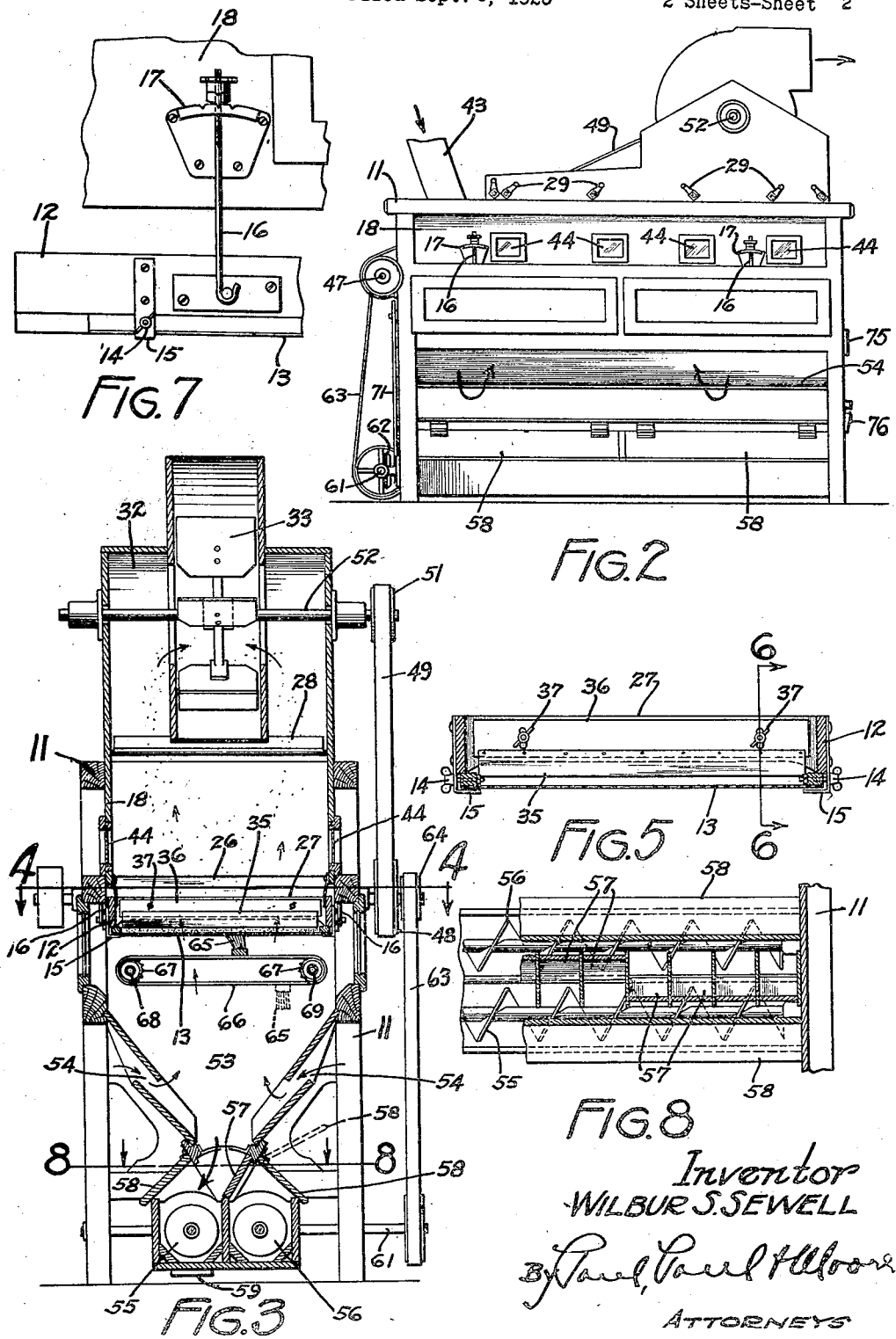
Inventor
WILBUR S. SEWELL
ATTORNEYS Patented Oct. 2, 1928.

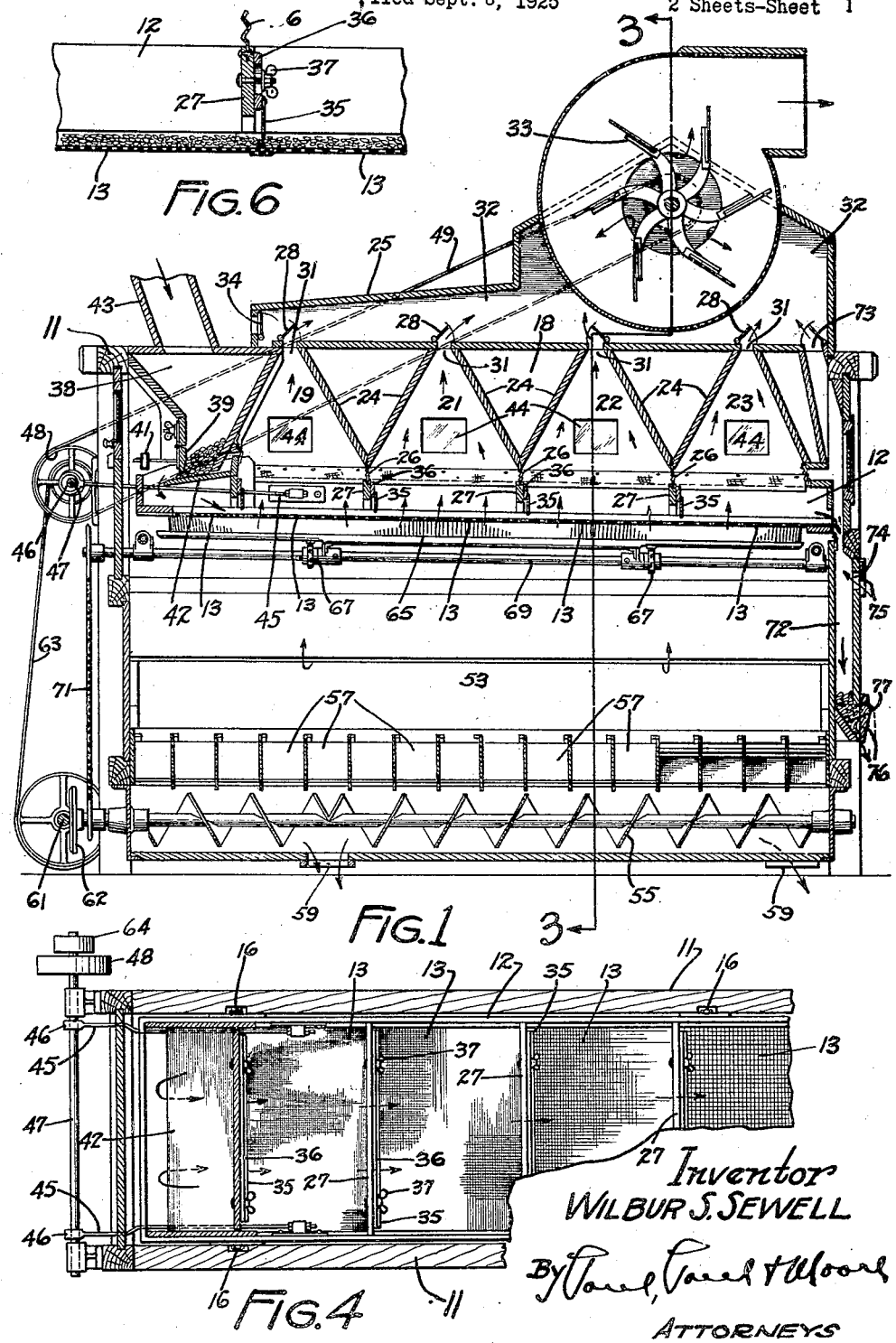

1,686,107

UNITED STATES PATENT OFFICE.

WILBUR S. SEWELL, OF MINNEAPOLIS, MINNESOTA, ASSIGNOR TO STRONG-SCOTT MANUFACTURING CO., OF MINNEAPOLIS, MINNESOTA, A CORPORATION OF MINNESOTA.

AIR-CONTROLLED PURIFIER.

Application filed September 8, 1925. Serial No. 55,073.

This invention relates to purifiers adapted for cleaning, purifying and classifying ground grain and small seeds though capable of use on comminuted material generally and the apparatus is particularly adapted for cleaning and classifying cereal products such as for instance ground wheat, removing therefrom the lighter particles and other undesirable material.

The primary object of the invention is to provide a purifier having means for controlling the flow of air currents through the separating sieve, the material as it passes over the sieve being compelled to pass through currents of air extending transversely the full width of the sieve so that the entrance of the material into these currents and the action of the air currents upon the material is positively insured. Usually in machines of this character, the material may be subjected to varying degrees of suction which at some point may be substantially negligible resulting in an unsatisfactory and uneven separation or purifying of the material. In my apparatus, the screen surface is so divided and the flow of air through the screen section is so controlled that the operator of the machine is able to regulate to a nicety the passage of the air currents through the varying meshes of the sieve and the material thereon and cause the distribution of such currents the full width of the sieve and through any desired section thereof.

A further object is to provide means connecting the suction fan of the machine with the chambers above the sieve sections so that the volume and velocity of the air currents through these chambers can be easily controlled.

A further object is to provide means below the sieve on both sides thereof whereby the air currents entering the machine under the sieve can be balanced and evenly distributed.

Briefly, the particular object of this invention is to provide a purifier having means for positively and selectively controlling the upward flow of air through any section or portion of the sieve thereby increasing the efficiency and capacity of the machine.

Other objects of the invention will appear from the following description and accompanying drawings and will be pointed out in the annexed claims.

In the drawings there has been disclosed a structure designed to carry out the various objects of the invention but it is to be understood that the invention is not confined to the exact features shown as various changes may be made within the scope of the claims which follow.

In the accompanying drawings forming part of the specification,

Figure 1 is a vertical sectional view through the improved purifier showing the general construction of the interior thereof;

Figure 2 is a side elevation of the machine;

Figure 3 is a cross-sectional view on the line 3—3 of Figure 1;

Figure 4 is a sectional plan view on the line 4—4 of Figure 3 showing how the mesh of the sieve may vary in size in each section, the receiving end being relatively fine and the discharge end being comparatively coarse;

Figure 5 is a cross-sectional view of the sieve showing the means provided for taking up slack in the mesh which preferably is of a flexible material;

Figure 6 is a detail sectional view on the line 6—6 of Figure 5 showing the air seal between each air chamber;

Figure 7 is an enlarged sectional view showing the means provided for supporting the sieve; and Figure 8 is a sectional plan view on the line 8—8 of Figure 3 showing the means provided in the bottom of the hopper for directing the material passing through the sieve into the proper conveyor.

In the accompanying drawings, 11 represents the frame of the machine in which a rectangular sieve frame 12 is mounted having a suitable sieve 13, preferably silk, secured to the frame by suitable means such as thumb screws and nuts 14 and supporting brackets 15, (see Figure 5). Rocker arms 16 support the sieve frame 12 and have their lower ends pivotally connected to the frame and their upper ends pivotally and adjustably supported in brackets 17 secured to the side walls 18 of the machine frame. This construction allows vibratory movement of the sieve frame as usual in machines of this type.

As shown in Figures 1 and 4, the sieve is divided into sections, each of which may have a different size mesh. The section adjacent the receiving end of the sieve is preferably relatively fine so that only the finest particles of material or stock may pass therethrough, the next section being coarser and so on to the end of the screen, the last section being comparatively coarse as shown in Figure 4.

Above the screen I provide a series of independent air chambers 19, 21, 22 and 23 formed by means of transverse inclined walls 24 secured to the side walls 18 and the top 25 of the machine frame. A flexible sealing connection 26 is provided at the intersection of each adjoining pair of inclined walls 24 and a series of cross bars 27 having their ends secured to the side walls of the sieve frame as shown in Figures 4 and 6. These flexible sealing connections may be of any suitable material such as canvas or ducking and function to prevent the passage of air between the apex of the walls 24 and the cross bars 27 while the machine is in operation. These air chambers, as shown in Figure 1, are wedge-shaped or their walls diverge from the top to the bottom in the form of a letter A so that the air currents striking these inclined walls will be deflected inwardly and upwardly toward the apex of each chamber and the air currents will flow through the sections of the sieve beneath each chamber and through the material that may be upon a certain section independently of the air currents and the material of the other sections and in so doing the lighter particles will be lifted from the material and discharged from the machine. I am thus able by this plurality of suction chambers to provide for a number of individual treatments of the material in the same machine and the decreasing area upwardly of each chamber provides for increasing velocity of the air currents as they pass upward and prevent possibility of the separated material falling back upon the sieve after being lifted into the chamber above. As shown in Figure 1, the air chambers are of uniform shape and size and the upwardly converging walls thereof have the same degree of inclination or are positioned at substantially the same angle with respect to the sieve beneath. The uniformity of these chambers is very important as it equalizes the conditions that govern the suction which in turn affects the area of material to be purified, an essential feature of the machine. The object is to control the purification by means of air currents and I have found by providing air chambers of the same shape. I am able to more effectually bring about the desired conditions as air chambers fashioned in this way are less liable to be affected by air eddies, and outside disturbing leaks, and the process can be air controlled more readily and the purifying operation will be more rapid and better. I, therefore, claim that a multiple chambered machine with all the chambers alike particularly in shape and with walls converging at the same angle allows uniform air control, an essential condition in a machine of this type. I have found that with the walls of the chambers converging equally and gradually, the air passing upwardly through the material will act on the material alike in each compartment and as the walls converge gradually all the area acted upon in the purifying surface of one compartment will be subjected to approximately equal suction. Each point on a transverse line of the screen surface is equi-distant from the outlet. Furthermore, as the air passes upward through the screen and the material thereon, the velocity is increased by the converging walls and the chance of the material falling back upon the screen is thereby lessened.

At the apex of each chamber, I provide a valve or gate 28 operable by means of hand levers 29 to control the flow of air through openings 31 provided in the wall of each chamber at the apex thereof. These openings extend entirely across the chambers the full width of the sieve beneath and when suction is applied to these openings, air currents will be established upwardly through the sections of the sieve the full width thereof and the material delivered to the sieve must pass through these air currents and will be subjected to the separating action of such currents in each chamber. The gates 28 are for the purpose of controlling or regulating the flow of air through the individual chambers, the operator having independent control of each gate and being able thereby to positively regulate the passage of the air currents through the different sections of the sieve and the individual air chambers. The individual chambers are sealed as described, to prevent leakage, one chamber with respect to the others and at the sides of the machine.

Above the air chambers, a suction chamber 32 is provided having a suction fan 33 and when this fan is in motion, a circulation of air will be established which will flow upwardly through the meshes of the screen into the air chambers and from thence into the suction chamber and the fan for final discharge into a suitable receiving means, not shown.

The suction chamber, as shown, has tapered walls or walls that gradually converge to a point remote from the suction fan so that the apex of the taper communicates with the air chamber discharge opening that is most distant from the fan, and thereby the velocity of the air currents flowing through the discharge openings will be equalized substantially without making any considerable variation in the relative adjustment of the air controlling valves. In other words, the structure of the suction chamber is such that substantially the same adjustment of the air controlled valves is permitted with substantial uniformity in the velocity of the air currents in the air chamber discharge openings. A valve 34 is preferably provided in the suction chamber 32 adjacent the valve 28 through which free air may be drawn into the chamber when it is desired to decrease the flow and volume of air drawn into the air chambers through the meshes of the screen. By the manipulation of the valve 34 and the control valves 28 for each chamber the flow of air into and through the chambers may be regulated to the proper degree required for any given material. By the use of these valves, the flow of air into each chamber may be varied as required to raise the lighter particles from the heavy material passing over the meshes of the sieve. It is evident that a number of purifiers, each connected by suitable chambers with a single suction fan may be provided without changing its mode of operation and as this manner of connecting sieve purifiers together would amount to mere duplication of the one machine shown, I have thought it unnecessary to illustrate or describe such an arrangement herein. The gates 28 control the flow of air from the air chambers to the suction chamber 32 and the upper wall 25 of the suction chamber gradually diverges from the lower wall in the direction of the suction fan so that the cross sectional area of the suction chamber increases proportionately toward the fan as the distance of the openings 31 from the suction fan decreases. In other words, the cross sectional area of the suction chamber progressively increases opposite the outlet openings of the air chambers thereby compensating for the increasing volume of air and maintaining a constant velocity. Evidently, this is an important feature for with varying velocities in the suction trunk, there would be accumulations of chaff at points of low velocity. The valves 28 in this machine function to vary the amount of air required by the stock, and uniform air control is obtained by the corresponding shape and size of the air chambers.

Strips 35 of a suitable flexible material such as canvas are secured to bars 36 adjustably mounted on the rails 27 and operate to close the gap between the mass of material on the sieve and the cross rails. I prefer also to provide means for distributing the material over the surface of the sieve consisting of a hopper 38 having the hinged gate 39 provided with a weight 41 and an inclined plate 42 is positioned beneath the hopper and vibrated with the sieve frame. The feed spout 43 delivers material to the hopper. Suitable openings 44 are provided in the walls of the air chambers through which the operator may observe the contents of the chambers and the action of the air currents on the material that is being separated. Pitmen 45 mounted upon suitable eccentrics 46 carried by a shaft 47 are provided in connection with the sieve and a pulley 48 is connected by a belt 49 to a pulley 51 upon the shaft 52 whereon the fan 33 is mounted.

Another important feature of this machine is the provision of aerating the finished and partially finished products which pass down through the machines of the sieve as the material flows thereover. Such means consists preferably in an elongated hopper-like chamber 53 extending preferably the full length of the machine as shown in Figure 1. The walls of this chamber converge from the top to the bottom and are provided with longitudinal gaps or openings 54 so positioned that the distance from the openings in the slanting sides will be nearly equal to all parts of the surface of the sieve as the air enters the gaps and flows upward through the sieve when the suction fan is in operation. By drawing the air into the hopper chamber 53 from opposite sides below the sieve as above described the upward air flow through each sieve section and its individual air chamber will be uniform throughout the entire surface of the sieve and all the material passing over the sieve will thereby be subjected to the uniform action of the air currents and such action will extend the full width of the sieve by reason of the transverse air gaps in the apex of each air chamber. This provision for the delivery of air to the chamber beneath the sieve insures the entrance of air currents to all parts of the sieve and eliminates uneven eddies or currents.

Screw conveyors 55 and 56 are preferably provided beneath the hopper 53, one adapted to receive the finished product while the other may receive the coarser material to be returned to a grinder and re-ground. A series of gates or shutters 57 are provided at the bottom of the chamber 53 so that the material may be selectively shunted into the proper conveyor. Doors 58 permit access to the interior of the machine for changing the position of the gates, this construction being common to machines of this type. Each conveyor is preferably provided with a discharge opening 59 as shown in Figure 1 and the conveyors may be operated from a shaft 61 and bevel gear drives 62, the shaft 61 being driven from a belt 63 on a pulley 64. Means are preferably provided comprising a brush 65 mounted upon suitable chains 66 carried by sprockets 67 for cleaning the bottom of the sieve. The sprockets 67 are mounted on shafts 68 and 69 connected by the chain drive 71 to one of the conveyor shafts.

The passage 72 receives the tailings and communicates with the suction chamber 32 through an opening 73. 74 is an air intake opening provided in the passage 72 and has a sliding gate 75 for increasing the flow of air therethrough. A hinged gate 76 automatically closes the discharge 77 of the passage 72 and prevents air from being drawn into the passage.

In the operation of the purifier, material to be cleaned and separated is delivered to the hopper 38 and fed onto the receiving end of the screen, the delivery being substantially uniform the entire width of the screen and the incline of the screen is sufficient to cause the material to travel by gravity thereover when the sieve is vibrated. As the material passes over the first sieve section beneath the initial air chamber, the finer particles will pass through the mesh and drop into the chamber beneath for delivery into one of the conveyors. By the adjustment of the valve in the transverse opening of the air chamber 19, the flow of air through the mesh and through the screen and through the material thereon may be controlled so that when stock or material first enters the chamber, the lighter particles will be floated to the top of the mass and be carried away by the air currents. The remaining lighter particles not removed in the first chamber will float on the top of the mass and pass into the next chamber 21 where a similar operation and separating action will take place. As each succeeding section of the screen is coarser than the preceding one, the finer particles will be gradually separated from the coarser as the material passes over each section of the screen and through each air chamber. Thus a stronger air current can be admitted through the regulating valves of each succeeding air chamber as the material flows from one chamber to the next until it has been subjected to the separating action in each chamber.

The tailings at the end of the sieve will be returned for further grinding and separating and as this material is comparatively coarse it is discharged into the suction passage 72 and there subjected to suitable air treatment. The main suction chamber 32 in which the fan 33 is located or to which a suction pipe is led from a common fan for a number of machines is so constructed that the air will have substantially the same velocity at all points therein regardless of whether the valves 28 are partially or wide open. Should the suction through the air chambers be too great the valve 34 at the end of the suction chamber 32 may be opened to admit free air and thereby decrease the velocity or volume of air flowing through the air chambers.

From the foregoing description, it will be noted that the apparatus may be utilized to thoroughly clean and purify the material and second, to separate from the coarser material the material of the proper degree of fineness for the finished product. By the employment of several air chambers, and the equalizing of air distribution from below each section of the sieve the material in passing from one sieve section to the next and through each succeeding air chamber may be subjected to the proper air treatment for thoroughly and efficiently removing all the lighter particles or undesirable material from the stock passing over the sieve.

This apparatus may be used as a single unit or machine as shown in the accompanying drawings and as above described or, if desired, two or more machines may be arranged in close proximity to provide means for treating different, or the same kinds of material at one time. When used as a double machine employing two units, the same kind of material may be passed through both machines at the same time, or one kind of material may be passed through one unit and another kind of material through the second unit. When thus arranged, the double conveyors of each unit are set apart so as to provide air intakes on opposite sides of the hopper chamber 53, thereby maintaining a uniform distribution of air below each sieve as described with reference to the single machine or unit. Each section or unit of the double machine may also be provided with a complete sieve-cleaning mechanism to prevent mixing of the finished materials. Each unit may also be provided with an independent fan and individual suction chambers or detached fan and chamber so that the velocity or volume of air passing through either unit may be varied by manipulation of the air valves 28 independently of the other unit. Thus the flow of air through either unit may be independently regulated to conform to the requirements of the particular kind of material being passed therethrough for treatment. It will be noted that when the machine is in use and the material is flowing over the surface of the sieve that the flexible sealing means 35, as plainly shown in Figure 6, will permit the free flow of the material to be separated, but will effectually separate adjacent chambers one from the other as far as the passage of air from one to the other is concerned. Thus each chamber is independent of all the others and will receive the air currents passing through the meshes of the sieve section opposite which the chamber may be located. The chambers being all alike and having walls converging at the same angle and the discharge openings extending entirely across the chambers the full width of the sieve and the suction trunk being proportioned in cross sectional area to obtain the same velocity of the air currents and compensate for the difference in distance of the chamber outlets from the fan, it follows that there will be a uniform suction at all corresponding points in the chambers and substantially the same degree of suction in all the chambers, thus insuring and permitting air control. The narrow gaps or air intakes leading into the chamber below the sieve preferably extend the full length of the sieve and insure uniform delivery of the air to all sections of the sieve.

I claim as my invention:

1. An apparatus of the class described comprising a frame, a vibrating sieve whereto the material to be separted is delivered, means dividing the space above said sieve into a series of separate air chambers having transverse walls converging upwardly at substantially the same angle from said sieve whereby the suction will be substantially uniform in all the chambers, each chamber having a discharge throat or opening transversely of the sieve, said converging walls extending to the top of said chambers and near said openings, means for establishing currents of air selectively through sections of said sieve and through said chambers and openings, the air currents operating upon the material to separate the lighter from the heavier particles, and guided to said openings by said converging walls, and means for controlling the flow of the air currents through said sieve and chambers.

2. An apparatus of the class described comprising a frame, a vibrating sieve whereto the material to be separted is delivered, means dividing the space above said sieve into a series of air chambers of uniform shape and size, the walls of said chambers having a yielding bearing on said sieve and separating and sealing each chamber from the others, the upper walls of said air chambers having discharge openings, and means for controlling the flow of air therethrough, and means for establishing currents of air upwardly through sections of said sieve and through said air chambers and the material moving on said sieve.

3. An apparatus of the class described comprising a frame, a vibrating sieve composed of sections of different mesh whereto the material to be separated is delivered, means dividing the space above said sieve into a series of separate air chambers communicating respectively with said sieve sections and of uniform shape and size, each chamber having converging walls of substantially the same pitch and a discharge opening at its apex the full width of the chamber, a suction means having a chamber communicating with said opening, means for controlling the flow of air through said air chamber openings, and means for admitting air to said suction chamber independently of said air chamber openings.

4. An apparatus of the class described comprising a frame, a vibrating sieve whereto the material to be separated is delivered, said sieve being composed of a series of sections of varying mesh, a series of separate air chambers provided in the space above said sieve, said chambers being of uniform shape and size one for each mesh section, and means for establishing currents of air selectively through said sieve sections and chambers, the air currents of each chamber being prevented from mingling with the currents of the other chambers, and means for admitting air on both sides to the space beneath said sieve.

5. A machine of the class described comprising a casing, a vibrating sieve mounted therein divided transversely into a series of sections of varying mesh, means for delivering the material to be separated upon one end of said sieve, the material moving in a comparatively thin stream over the surface of said sieve to the discharge end thereof, a series of chambers arranged above said sieve, each chamber having upwardly converging walls and a discharge opening at its apex, the walls of said chambers converging at substantially the same angle and all of said chambers being of substantially the same shape, and each chamber having means for sealing the opening between the chamber wall and sieve against the passage of air currents from one chamber to the other, said casing having air intakes below said sieve, said chambers having means for controlling the flow of air currents through said outlets, and means for establishing upwardly flowing air currents of equal velocity through said sieve and air chambers.

6. A machine of the class described comprising a casing, a vibrating sieve mounted therein divided transversely into a series of sections of varying mesh, means for delivering the material to be separated upon one end of said sieve, the material moving in a comparatively thin stream over the surface of said sieve to the discharge end thereof, a series of chambers arranged above said sieve, each chamber having upwardly converging walls and a discharge opening at its apex, the walls of said chambers converging at substantially the same angle and all of said chambers being of substantially the same shape, and each chamber having means for sealing the opening between the chamber wall and sieve against the passage of air currents from one chamber to the other, said casing having air intakes below said sieve, said chambers having means for controlling the flow of air currents through said outlets, and means for establishing upwardly flowing air currents of equal velocity through said sieve and air chambers, the outlet openings of said air chambers being coextensive the width of said sieve sections whereby entrance of air currents to the sieve the full width thereof is insured.

7. A machine of the class described comprising a casing, a vibrating sieve mounted therein divided transversely into a series of sections of varying mesh, means for delivering the material to be separated upon one end of the sieve to move thereover toward the discharge end thereof, a series of air chambers of corresponding shape arranged above said sieve, each chamber having means cooperating with the sieve and the material thereon to prevent the passage of air currents from one chamber to an adjacent one, whereby each chamber is independent of all the others, said chambers having converging walls merging at the top into transverse discharge openings for the air currents and gates for said openings, a suction trunk and a suction means connected therewith, the outlets of said chambers opening into said trunk, the cross sectional area of said trunk decreasing with the distance from said suction means whereby air currents of substantially equal velocity may be maintained through said chamber outlets, and the uniform shape of said chambers insuring substantially equal suction in said chambers.

In witness whereof, I have hereunto set my hand this 2nd day of September, 1925.

WILBUR S. SEWELL.